United States Patent Office 3,568,435
Patented Mar. 9, 1971

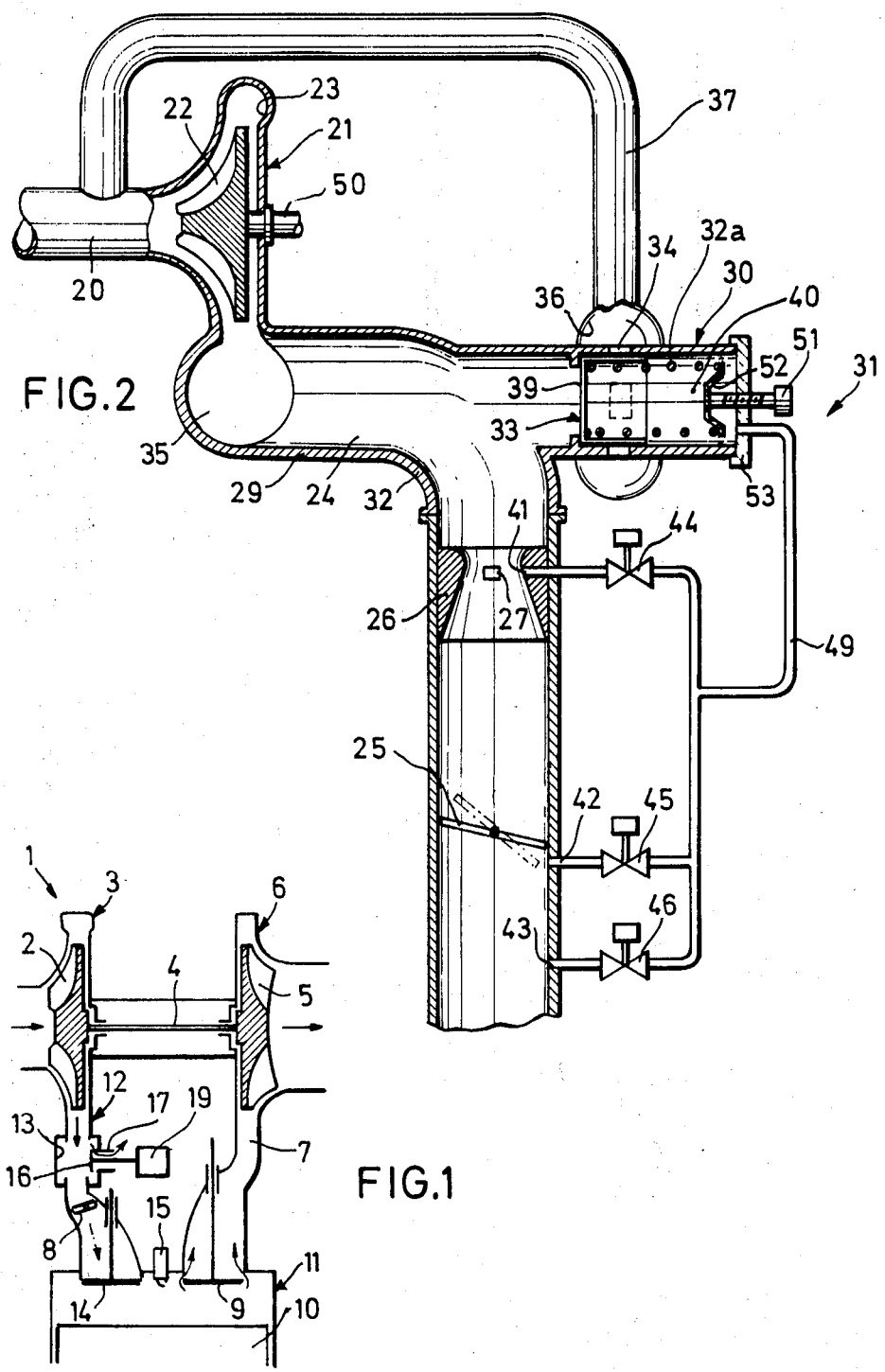

3,568,435
METHOD OF AND APPARATUS FOR SUPER-
CHARGING EXTERNALLY IGNITED IN-
TERNAL COMBUSTION ENGINES
Michael G. May, 15 Obere Strasse,
7 Stuttgart-Berg, Germany
Filed Mar. 27, 1969, Ser. No. 811,110
Claims priority, application Germany, Mar. 27, 1968,
P 17 51 061.0
Int. Cl. F02b 37/08; F04d 27/02
U.S. Cl. 60—13
13 Claims

ABSTRACT OF THE DISCLOSURE

In supercharged internal combustion engines part of the compressed intake air is discharged from the intake conduit by means of a bypass adjusting mechanism which is responsive to pressure conditions in said conduit and which controls bypass openings therein with a varying pressure derived from the difference between at least one static pressure and the total pressure of the compressed intake air.

BACKGROUND OF THE INVENTION

The invention relates to a method of and an apparatus for supercharging an externally ignited internal combustion engine of the type having an exhaust gas-operated turbosupercharger for drawing and compressing intake air and a throttle valve disposed downstream of the supercharger to control the output of the engine by varying the flow rate of said air.

Exhaust turbosuperchargers have been used on diesel engines—for increasing the engine performance—without encountering difficultes since in such engines there is no throttle device in the air intake conduit for the control of the engine output. Due to the absence of such a throttle device, the turbosupercharger operates in all steady and unsteady ranges of supercharging conditions in a satisfactory manner and the supercharger is not exposed to any excessive loads.

Difficult problems arise, however, when an exhaust turbosupercharger is intended to be used on an externally ignited internal combustion engine in which a throttle device is arranged downstream of the supercharger for varying the flow of the intake air for the purpose of varying the engine output. Such combination has been operating satisfactorily only in cases where the internal combustion engine has been working substantially under constant load conditions (e.g. airplane engines). When exhaust turbosuperchargers were used in connection with externally ignited internal combustion engines operating under widely varying load conditions, as it is the case particularly in engines for automotive vehicles, it has been found that in certain ranges of supercharging conditions the supercharger is unexpectedly exposed to heavy strain which rapidly leads to damages that may eventually culminate in the total destruction of the supercharger. Further, in these ranges of supercharging condition intolerably strong supercharging noises may appear. The main cause for these disadvantages is a drop below the surge limit of the supercharger in certain ranges of supercharging conditions where, among others, powerful oscillations of the intake air stream appear.

OBJECTS OF THE INVENTION

It is the principal object of the invention to provide a method of and an apparatus for the supercharging of externally ignited internal combustion engines wherein the aforenoted disadvantages and particularly a drop below the surge limit of the supercharger are eliminated and which permit the use of high power exhaust turbosuperchargers with externally ignited internal combustion engines operating under widely and suddenly varying load conditions.

It is a further object of the invention to provide a method of and an apparatus for the supercharging of externally ignited internal combustion engines wherein the strain on the exhaust turbosupercharger is decreased in critical ranges without affecting thereby its performance in other ranges. Thus, for example, the acceleration of the vehicle may be performed with optimal output of the supercharger without exposing the same to excessive strain in the critical ranges.

It is still another object of the invention to provide a method of and apparatus for the supercharging of externally ignited internal combustion engines wherein the output of the exhaust turbosupercharger device is adjusted to the safe load of the internal combustion engine in a simple manner particularly to limit the maximum output of the engine without limiting the other output ranges.

SUMMARY OF THE METHOD, DEFINITION OF TERMS AND ADVANTAGES

In order to achieve the aforenoted objects, the method according to the invention comprises continuously and automatically discharging through a bypass, in at least one predetermined range of supercharging condition and as a function of at least one magnitude of condition (or variable of state), one part of the compressed intake air for decreasing the flow rate of intake air received by the combustion chamber or chambers of the internal combustion engine.

By supercharging condition there is meant the pressure conditions of the intake air (or—depending where the fuel is added—of the air-fuel mixture) upstream and downstream of the throttle device.

By the range of supercharging condition there is generally meant a steady or unsteady range of the supercharging condition. The supercharging condition depends on a number of magnitudes of condition; the most significant of these are: the r.p.m. of the supercharger, the r.p.m. of the engine, the position of the throttle valve, the pressure conditions in the intake air flow, the velocity of the intake air flow, and the flow rate of the fuel mixture received by the internal combustion engine.

By magnitudes of condition (or variables of state) there are meant to be designated magnitudes which affect directly or indirectly the supercharging condition or are affected thereby or the magnitudes of the supercharging conditions itself.

A fall or drop below the surge limit means that some magnitudes of condition (or the relationship therebetween) affecting the operation of the radial compressor-type supercharger assume such values that its operation passes from a stable zone to an unstable zone.

By discharing the intake air at least in those ranges of supercharging condition in which a drop below the surge limit may occur and by effecting said discharge or bypass in such an amount as to securely prevent such drop, the difficulties discussed before are eliminated. Further, by practicing the method according to the invention, it is possible to limit the maximum output of the supercharger as far as its charging effect on the engine is concerned. Thereby the output of the internal combustion engine may be limited to a desired value without affecting the output of the engine in the other output ranges. Thus, despite the aforenoted throttling of the engine output, optimal accelerations of the vehicle may be achieved up to approximately its maximum speed. Also, by practicing the invention, the strain on the exhaust turbine of the turbosupercharger is decreased. Normally, such a strain is of very significant magnitude in externally ignited internal combustion engines because of the high exhaust gas temperature. Consequently, without limiting the engine performance, the turbine may easily be destroyed unless it is made of heat-resistant materials of the highest quality. Such materials, however, are expensive and are difficult to machine.

SUMMARY OF VARIOUS WAYS FOR PRACTICING THE INVENTION

It has been found to be particularly advantageous to discharge part of the intake air as a function of the following magnitudes of condition: one or more static pressures of the intake air flow and/or the total pressures of the compressed intake air flow and/or the position of the throttle valve and/or the fuel mixture consumption of the internal combustion engine and/or the exhaust temperature and/or the r.p.m. of the supercharger and/or the r.p.m. of the internal combustion engine.

In principle, discharge of the intake air may be effected in every range of supercharging condition. It is preferred, however, to discharge intake air only in those ranges of supercharging condition in which a drop below the surge limit of the supercharger occurs or may occur and/or a limitation of the engine output is desirable or necessary. The flow rate of the bypassing intake air is determined to ensure the occurrence of the desired effects, i.e. elimination of said drop and obtaining the desired limitation of the engine output. The flow rate of the bypassing intake air may be controlled and, if desirable, may be automatically regulated. For controlling or regulating magnitudes the aforedescribed magnitudes of condition may be utilized. In simple cases a single magnitude of condition may be used for the control or regulation of the flow rate of the bypassing intake air. In general, however, it is expedient to control or regulate the flow rate of the bypassing intake air in at least one range of supercharging condition as a function of two or more magnitudes of condition. As mentioned hereinbefore, these magnitudes of condition and/or further magnitudes of condition may be used individually or in a suitable combination for the control or regulation of the flow rate of the bypassing intake air. The control or regulation may be performed in different ranges of supercharging condition by means of different magnitudes of condition or different combinations thereof.

For discharging part of the intake air, any location along the intake air flow may be selected as the branch-off point, provided the desired effect is achieved. If bypassing is for the purpose of preventing a drop below the surge limit of the supercharger, then the bypassing flow has to effect a decrease of the pressure of the intake air between the supercharger and the throttle valve. For this purpose it is preferred that part of the intake air is taken out from the intake conduit system at a location between the supercharger and the throttle valve. It is to be understood that in some cases intake air may be taken out directly from the supercharger across a bypass and may be reintroduced into the intake air flow upstream of the inlet of the supercharger. If, on the other hand, intake air is discharged for the purpose of limiting the engine output, then, in some cases, the air may be taken out expediently downstream of the throttle valve. This applies particularly for internal combustion engines in which the fuel is injected directly into the combustion chamber. If, on the other hand, the internal combustion engine is of the type where the fuel is injected into the air intake conduit system leading to the combustion chambers, then the intake air is, for the purpose of avoiding an unnecessary increase in the fuel consumption, taken out at a location upstream of the point where it is mixed with fuel.

SUMMARY OF THE APPARATUS FOR PRACTICING THE INVENTION

For performing the afore-outlined method, there is provided, in association with an externally ignited internal combustion engine, particularly for use in automotive vehicles, a supercharger including an exhaust gas-driven turbine and a compressor driven thereby for drawing intake air, compressing and delivering the same through an intake conduit system in which there is disposed, downstream of the supercharger, a throttle for controlling the output of the internal combustion engine. This supercharger system is characterized in that in the intake conduit system there is provided, for discharging intake air, at least one outlet or bypass opening, the flow passage section of which may be adjusted by means of at least one automatic adjusting device which is responsive to at least one magnitude of condition and which has at least one sensor responsive to a magnitude of condition.

By adjusting device there is meant any kind of adjusting system which is adapted to vary the outlet opening as a function of at least one magnitude of condition. Preferably, the adjusting device is a control device, or, in some cases it may be a regulating device. Since it is preferred that in at least one range of supercharging condition no intake air is discharged, the adjusting device is to be designed in such a manner that at least for such a range it may close the outlet openings.

If in the diverse ranges of supercharging condition intake air is to be discharged in response to the diverse magnitudes of condition, the adjusting system is advantageously designed in such a manner that the diverse magnitudes of condition may be applied thereto as control or regulating magnitudes. It is feasible to utilize two or more adjusting devices associated with diverse outlet openings or adapted to affect the same outlet openings in an interchangeable manner. It is particularly advantageous to cause the discharge of intake air in all ranges of supercharging condition as a function of the same magnitude or magnitudes of condition affecting a single adjusting mechanism. Preferably, the magnitudes of conditions may be a total pressure and at least one static pressure of the intake air flow; the differential pressure of these pressures is then used to vary the bypass openings.

The invention will be better understood as well as further objects and advantages will become more apparent from the ensuing detailed specification of a preferred, although exemplary, embodiment of the invention taken in conjunction with the drawings.

BRIEF DESCRIPTION OF THE DRAWINGS

FIG. 1 is a schematic sectional view of an apparatus according to the invention; and FIG. 2 is a sectional view of an intake conduit system comprising a supercharger and an apparatus for controlling the discharge of the compressed intake air.

DESCRIPTION OF THE EMBODIMENT

Turning now to FIG. 1, the exhaust gas driven turbosuperchager 1 has a supercharger 3 including a compressor wheel 2 for drawing and compressing intake air and an exhaust gas-driven turbine 6 including a turbine wheel 5 adapted to drive compressor wheel 2 through a shaft 4 to which both wheels 2 and 5 are keyed. The exhaust turbine 6 is disposed in the exhaust conduit system 7 downstream of the exhaust valve 9 of a piston-cylinder assembly 10, 11 associated with an internal combustion engine particularly adapted to drive automotive vehicles. The supercharger 3, which is designed as a radial compressor, is disposed in the air intake conduit system 12 and forces the intake air compressed thereby through a pressure conduit 13 including a throttle valve 8 and an inlet valve 14, into the combustion chamber in which the fuel-air mixture is ignited by externally energizing the spark plug 15. The performance of the engine is substantially increased by virtue of the exhaust turbosupercharger.

In the pressure conduit 13 there is provided an outlet port 17 controlled by a valve 16 for the discharge of intake air. The valve 16 is controlled by means of an adjusting device 19 as a function of at least one magnitude of condition in such a manner that in at least one range of supercharging condition intake air is continuously discharged into the atmosphere through the outlet port 17. The sensors associated with the adjusting device 19 and responsive to the magnitudes of condition that determine the closing or opening of the outlet port 17, are not illustrated in FIG. 1.

Turning now to FIG. 2, there is illustrated a preferred embodiment of a control device for the controlled discharge of intake air from the intake conduit system of an externally ignited internal combustion engine. The intake air is drawn through an air filter (not shown) and a suction tube 20 by means for a supercharger generally indicated at 21 and comprising a compressor wheel 22 driven by an exhaust turbine (not shown) through shaft 50. The intake air, pressurized by compressor wheel 22, is forced thereby through a conduit 23 circumferentially extending about wheel 22 into a pressure conduit 24 that leads to the combustion chamber or combustion chambers of the internal combustion engine (not shown). In the pressure conduit 24 there is disposed a pivotable butterfly valve 25 for throttling the intake air flow and a venturi nozzle 26, in the narrowest flow passage section of which there is disposed a fuel nozzle 27 for injecting, into the flow of intake air, fuel taken from a float chamber of a conventional carburetor (not shown). It is thus to be understood that in this embodiment the inake air downstream of venturi nozzle 26 contains carbureted fuel and thus constitutes the air-fuel combustion mixture. The pressure conduit 24 has an elbow turn at 32. As a linear continuation of the conduit portion 29 there is proviedd an inwardly open cylinder 30 of an adjusting system generally indicated at 31 for the controlled discharge of intake air. In cylinder 30 there is disposed an axially displaceable control piston 33 loaded by a compression spring 32a. Piston 33 is, at the same time, a pressure-responsive element sensing the total pressure of the intake air to which the pison 33 is directly exposed. In its position shown in FIG. 2, the cylinder 33 closes the outlet or bypass openings 34 provided in the side wall of cylinder 30. The total area of the outlets 34 corresponds in this preferred embodiment approximately to one-half of the free flow passage section of the supercharger outlet 35.

The initial force of spring 32 may be adjusted by means of screw 51 secured to movable spring seat disc 52 and threadedly held in closure cap 53.

The outlet slots 34 open into an annular chamber 36 from which extends a conduit 37 into the suction pipe 20 for reinstroducing the bypassing intake air into the inlet of the supercharger. This reintroduction of the intake air is not an essential feature but is advantageous in that the noise caused by the outrushing intake air is muffled.

The outer face of the piston base 39 of the control piston 33 is exposed to the total pressure of the compressed intake air while the inner face of said base is exposed to a pressure prevailing in the cylinder chamber 40. The last-named pressure is taken from at least one static pressure of the intake air flow. The control piston 33 is thus exposed to the differential pressure between the total pressure of the compressed intake air flow and the aforenoted, at least one static pressure thereof.

In the presently described preferred embodiment three pressure sensor conduits 41, 42 and 43 open into the pressure conduit 24 at locations spaced longitudinally therealong. These sensors, the inlet openings of which are flush with the internal surface of the pressure conduit 24 and of the venturi nozzle 26, respectively, are responsive to static pressure of the intake air flow at spaced locations. Each pressure sensor conduit 41, 42 and 43 is provided with a closable two-way valve 44, 45 and 46, respectively. Further, each pressure sensor conduit 41, 42 and 43 merges into a common conduit 49 which communicates with the chamber 40. By means of the valves 44–46 the admission of static pressure to the chamber 40 may be regulated so that the pressure prevailing in chamber 40 corresponds either to a sole static pressure or to an adustable mixture of two or three static pressure of the intake air flow. The adjusting system 31 formed in this embodiment as a particularly advantageous and reliable control system, has two functions: it prevents a drop below the surge limit of the supercharger 21 and ensures a limitation of the maximum output of the internal combustion engine.

The pressure sensor 41 merges in the venturi nozzle 26 at approximately its narrowest flow passage section, where a particularly powerful static pressure is obtained. The pressure sensor 42 merges into the pressure conduit 24 in the vicinity of the butterfly valve 25 at a location where, in the closed position of the throttle valve 25 and up to an angular position thereof of about 10 to 15°, a static pressure prevails which corresponds to the static pressure prevailing immediately downstream of the butterfly valve 25. If, however, the butterfly valve 25 is opened more than 10 to 15°, the pressure sensor 42 measures a pressure which corresponds to the static pressure prevailing immediately upstream of the butterfly valve 25. The pressure sensor 43 measures exclusively a static pressure downstream of the butterfly valve 25.

OPERATION OF THE CONTROL DEVICE 31

In the discussion that follows, four examples for different settings of valves 4, 45 and 46 are given.

Example 1

Valves 44 and 46 are closed while valve 45 is open.

As long as the sensor 42 senses the static pressure behind the butterfly valve 25, downstream thereof, the control piston 33 due to the small pressure prevailing in chamber 40 because of the small static pressure in the pressure conduit 24 at the sensed location, is urged towards the right by the total pressure against the force of the spring 32. Consequently, in this range of supercharging condition (idling range and an adjoining range of low engine output), the outlet openings 34 are continuously open and intake air is continuously discharged. Thus, the intake air pressure in the pressure conduit 24 is decreased between the supercharger and the butterfly valve 25 in this range of supercharging condition to values where the supercharger, independently of its r.p.m., cannot fall below its surge limit. In the absence of such discharge of a part of the intake air, there would occur a drop below the surge limit in this range of supercharging condition at times when the supercharger would deliver small quantities of intake air at a high r.p.m. against a relatively high intake air pressure prevailing downstream thereof.

If, on the other hand, the butterfly valve 25 is opened at least to such an extent that the pressure sensor 42 is responsive to the pressure prevailing upstream of the butterfly valve 25, then the sensed static pressure is substantially higher and the control piston 33 is shifted into a position where it closes the outlet openings 34. Thus, under normal load conditions and during acceleration, the outlet openings 34 are closed. In this range of supercharging condition there is no danger that the supercharger drops below the surge limit; consequently, a discharge of intake air for preventing such occurrence is not necessary. If, however, the total pressure of the intake air flow affecting the outer face of the base 39 of control piston 33 exceeds the sum of the forces composed of the compression spring 32a and the static pressure prevailing in chamber 40, the piston 33 is again displaced toward the right and consequently the outlet openings 34 again open so that intake air is discharged for limiting the engine output. For this purpose the compression spring 32a is designed in such a manner that the outlet slots 34 are opened by the total pressure against the force of the relatively high static pressure and the force of the compression spring for limiting the engine output only when the flow rate of the air-fuel mixture (i.e. the consumption of the internal combustion engine) is very large at high engine r.p.m. and at relatively large or completely open throttle valve. In such cases the r.p.m. of the supercharger is correspondingly high. In this range of supercharging condition, intake air is continuously discharged for limiting the output of the internal combustion engine, whereby the quantity of the discharged intake air is so dimensioned that the desired throttling of output is achieved. This limitation of output prevents an overloading of the internal combustion engine and also, a substantial overheating of the exhaust turbine.

The danger of falling below the surge limit of the supercharger is particularly great when the butterfly valve 25 is suddenly closed from a wide open position. This sudden change occurs, for example, when vehicle is suddenly braked, abruptly ending a full acceleration (the supercharger r.p.m. is very high). When the butterfly valve is thus suddenly closed, the r.p.m. of the supercharger 21, due to its moment of inertia, decreases relatively slowly. Consequently, very high transient intake air pressures appear in the pressure conduit 24 between the supercharger 21 and the butterfly valve 25. These high pressures may cause an intolerably strong noise and, in particular, strong vibrations of the intake air stream are generated in the supercharger which may cause destruction of the compressor wheel 22. Since, as a result of, the rapid closing of the butterfly valve 25, the total pressure acting on the control piston 33 abruptly and substantially drops because of the substantial decrease of the flow velocity of the intake air, the control piston 33 tends, subsequent to the aforenoted "fully open throttle" condition, to close immediately and upon such occurrence, the aforenoted undesired high pressures would appear downstream of the supercharger. Such closing of the control piston 33, however, is prevented by the pressure sensor 42 since the latter, when the butterfly valve is in a closed position, responds to the very small static pressure prevailing behind the butterfly valve downstream thereof and consequently communicates a correspondingly low pressure with the chamber 40. As a result, during this unsteady range of supercharging condition, the control piston 33 is maintained in its open position. At high accelerations, on the other hand, the control piston closes immediately and reopens the outlet slots 34 for limiting the engine output only when the flow rate of intake air is high. Thus, the engine has, despite the output limitation, an optimal acceleration characteristic.

Example 2

Valve 44 is open while valves 45 and 46 are closed.

In this case the pressure difference continuously affecting the control piston 33 is a measure for the flow velocity of the intake air downstream of the supercharger 21 and upstream of the butterfly valve 25. In such a valve position, the discharge of intake air through the outlet slots 34 is exclusively a function of the fuel mixture consumption of the internal combustion engine. Beyond a predetermined flow rate of fuel mixture the outlet openings 34 are gradually opened as the flow rate increases. Thus, with a valve setting according to this example, the adjusting system 31 serves exclusively for limiting the engine output in a desired manner.

Example 3

Valve 46 is open while valves 44 and 45 are closed.

In a completely or almost completely open position of the butterfly valve 25 the differential pressure affecting the control piston 33 is, as it was the case in Example 2, a measure for the air-fuel mixture flow so that again, a desired throttling of the engine output may be obtained. In case the butterfly valve 25 is only slightly open or is in its closed position, then, at the level of the static pressure sensor 43, only a very small static pressure appears whereby, again, the control piston is caused to move into an at least partially open position. As a result, the intake air pressure appearing downstream of the supercharger is, in this low range of output, limited to values in which the supercharger may not fall below the surge limit.

Example 4

Two or all three of valves 44, 45 and 46 are partially or entirely open.

In this case a mixed pressure will appear in chamber 40, corresponding to the static pressures sensed by the operative sensors 41, 42 or 43. Thus, the aforediscussed three separate possibilites of valve setting may be combined in a desired and appropriate manner for controlling the intake air bypass.

As set forth before, the danger of falling below the surge limit of the supercharger is present when the butterfly valve is rapidly closed or almost closed from a relatively wide open position in which the supercharger r.p.m. is very high. As soon as the r.p.m. of the supercharger decreases to lower values, the danger of falling below the surge limit is generally over so that the bypass outlet openings could be, in principle, closed again. In order to simplify the control, however, a part of the intake air may be continuously discharged even when the butterfly valve is almost or entirely closed, as it was the case in an aforediscussed example. If, on the other hand, it is desired that intake air be discharged for the purpose of avoiding a drop below the surge limit only during the unsteady ranges of the supercharging condition in which the supercharger still compresses temporarily with a high r.p.m. the substantially throttled intake air, then this may be achieved, for example, by rendering the adjusting system directly responsive to the supercharger r.p.m. in such a manner that, independently of the position of the butterfly valve 25, at low supercarger r.p.m. the outlets 34 are constantly closed. If there is a danger of overheating the exhaust turbine, the exhaust conduit may be provided with a temperature-responsive member which, by means of the associated adjusting system, opens an outlet to discharge intake air when a predetermined high exhaust temperature is exceeded.

What is claimed is:

1. A method of supercharging an externally ignited internal combustion engine of the known type having (1) an intake pressure conduit leading to the combustion chambers of said engine, (2) an exhaust gas-operated turbosupercharger in said conduit for drawing intake air, compressing the same and forcing it through said conduit, (3) a throttle valve in said conduit downstream of said turbosupercharger to vary at will the flow rate of intake air for varying the output of said engine, (4) means defining a bypass outlet in said conduit to permit discharge of at least part of said compressed intake air and (5) an adjusting system for automatically opening and closing said bypass outlet, comprising the following steps:

(A) automatically opening and maintaining at least partially open said bypass outlet by said adjusting system in a high and in a low output range of said engine, said low output range including output conditions prevailing during idling of said engine and during transient, unstable conditions caused by a rapid decrease of engine load and (B) automatically closing and maintaining closed said bypass outlet by said adjusting system in the output range of said engine between said high and said low output ranges.

2. A method as defined in claim 1, wherein said low output range includes a limited output range immediately adjoining an output condition prevailing when said throttle valve is in its maximum throttling position.

3. A method as defined in claim 2, wherein said throttle valve is a butterfly valve and said limited output range is determined by any position of said butterfly valve ranging from said maximum throttling position to an open position of 10°–15°.

4. A method as defined in claim 1, wherein said adjusting system is actuated by pressures prevailing in said conduit for automatically opening and closing said bypass outlet.

5. A method as defined in claim 4, wherein said adjusting system is actuated by a differential pressure formed of the total pressure prevailing between said turbosupercharger and said throttle valve and of a static pressure prevailing within the range of said throttle valve.

6. A method as defined in claim 5, wherein said differential pressure is formed of the difference between said total pressure and the sum of said static pressure and an additional static pressure prevailing in said conduit at a location other than the range of said throttle valve.

7. A method as defined in claim 5, wherein the static pressure prevailing in the range of said throttle valve is identical to a static pressure prevailing immediately downstream of said throttle valve when the latter is in a maximum throttling and in a slightly increased open position; the static pressure prevailing in the range of said throttle valve is identical to a static pressure prevailing upstream of said throttle valve when the latter is in an open position beyond said slightly increased open position.

8. A method as defined in claim 1, wherein said adjusting system controls the output of said engine in the high output range responsive to the flow rate of air of said engine for preventing an overloading of said engine.

9. In an externally ignited internal combustion engine of the known type having (1) an intake pressure conduit leading to the combustion chambers of said engine, (2) an exhaust gas-operated turbosupercharger in said conduit for drawing intake air, compressing the same and forcing it through said conduit, (3) a throttle valve in said conduit downstream of said turbosupercharger to vary at will the flow rate of intake air for varying the output of said engine, (4) means defining a bypass outlet in said conduit to permit discharge of at least part of said compressed intake air and (5) an adjusting system for automatically opening and closing said bypass outlet, the improvement in said adjusting system comprising:
(A) a movable component for varying the flow passage section of said bypass outlet,
(B) means responsive to the total pressure prevailing in said conduit between said turbosupercharger and said throttle valve for urging said movable component in a first direction,
(C) means responsive to the static pressure prevailing in said conduit in the immediate range of said throttle valve for urging said movable component in a second direction opposite said first direction and
(D) spring means exerting a force on said movable component in one of said directions, the force of said spring means being so designed that in a high and in a low output range of said engine, the resultant of said forces causes said movable component to open and maintain at least partially open said bypass outlet, while in an output range of said engine between said high and said low output ranges, the resultant of said forces causes said movable component to close and maintain closed said bypass outlet.

10. An improvement as defined in claim 9, including a cylinder having a chamber, said movable component is formed of a piston slidably disposed in said cylinder isolating said chamber from said conduit; said means responsive to said total pressure includes a face of said piston externally of said chamber; said means responsive to said static pressure includes a face of said piston inside said chamber.

11. An improvement as defined in claim 10, wherein said bypass outlet is formed of at least one slot-like opening provided in the wall of said cylinder, said slot-like opening is directly closable and openable by said piston.

12. An improvement as defined in claim 9, wherein the force of said spring means is so designed that said movable component closes and maintains closed said bypass outlet when the difference between said total pressure and said static pressure falls below a predetermined value, said movable component opens and maintains open said bypass outlet to a maximum extent when the difference between said last-named pressures exceeds a predetermined value and in the range between said last-named two values said movable component maintains said bypass outlet partially open to an extent dependent upon the magnitude of difference between said total pressure and said static pressure.

13. An improvement as defined in claim 9, including
(A) means responsive to at least one additional static pressure prevailing in said conduit remote from the immediate range of said throttle valve,
(B) means to apply said static pressures to said movable component and
(C) means to selectively block or permit admittance of said static pressures to said movable component.

References Cited

UNITED STATES PATENTS

| | | | |
|---|---|---|---|
| 2,459,000 | 1/1949 | Morris | 230—22 |
| 2,463,865 | 3/1949 | Gilfillan | 230—22 |
| 2,470,565 | 5/1949 | Loss | 230—22 |
| 2,578,028 | 12/1951 | Udale | 60—13 |
| 2,620,783 | 12/1952 | Lee | 60—13 |
| 2,684,569 | 7/1954 | Buchi | 230—115 |
| 3,186,161 | 6/1965 | Bricout | 60—13 |
| 3,421,314 | 1/1969 | Michalke | 60—13 |

FOREIGN PATENTS

| | | | |
|---|---|---|---|
| 645,562 | 9/1962 | Italy | 230—22 |

DOUGLAS HART, Primary Examiner

U.S. Cl. X.R.

123—119; 417—300